United States Patent [19]

Broyles

[11] 4,226,448
[45] Oct. 7, 1980

[54] HEAT-RECOVERABLE METALLIC COUPLINGS

[75] Inventor: Harry C. Broyles, Sunnyvale, Calif.

[73] Assignee: Raychem Corporation, Menlo Park, Calif.

[21] Appl. No.: 3,990

[22] Filed: Jan. 16, 1979

Related U.S. Application Data

[63] Continuation-in-part of Ser. No. 869,720, Jan. 16, 1978, abandoned.

[51] Int. Cl.$^2$ ............................................. F16L 25/00
[52] U.S. Cl. ..................................... 285/381; 29/446; 72/342; 285/417; 285/422
[58] Field of Search ............ 285/381, 417, 382, 382.2, 285/256, 328, 422; 29/446, 447, 508, 509; 72/342

[56] References Cited

U.S. PATENT DOCUMENTS

| | | | |
|---|---|---|---|
| 3,245,699 | 4/1966 | Peterman | 285/256 X |
| 3,425,719 | 2/1969 | Burton | 285/382.2 |
| 3,805,567 | 4/1974 | Sinerco | 29/447 |
| 4,035,007 | 7/1977 | Harrison | 285/381 |

FOREIGN PATENT DOCUMENTS 2724178 8/1977 Fed. Rep. of Germany .......... 285/381

*Primary Examiner*—Dave W. Arola
*Attorney, Agent, or Firm*—Lyon & Lyon

[57] ABSTRACT

A novel coupling member which comprises a hollow, generally tubular metal member which is heat-shrinkable or can be rendered heat-shrinkable in the radial direction and is provided on its inner surface with at least three teeth in the form of radially extending rings, the distance (t) between any pair of adjacent teeth being less than 0.95 d and less than 4 w, where d is the internal diameter of the tubular member, and w is the wall thickness of the tubular member, there being at least one tooth either side of the tooth nearest the center of the tubular member, the distance from the center of the member to the tooth nearest the center of the member being from 0 to 0.3 d and the distance between the two teeth adjacent the tooth nearest the center of the member being more than the smaller of 0.4 d and 3 w. Such a coupling member can be expanded by mandrel expansion methods without danger of damaging the teeth.

21 Claims, 1 Drawing Figure

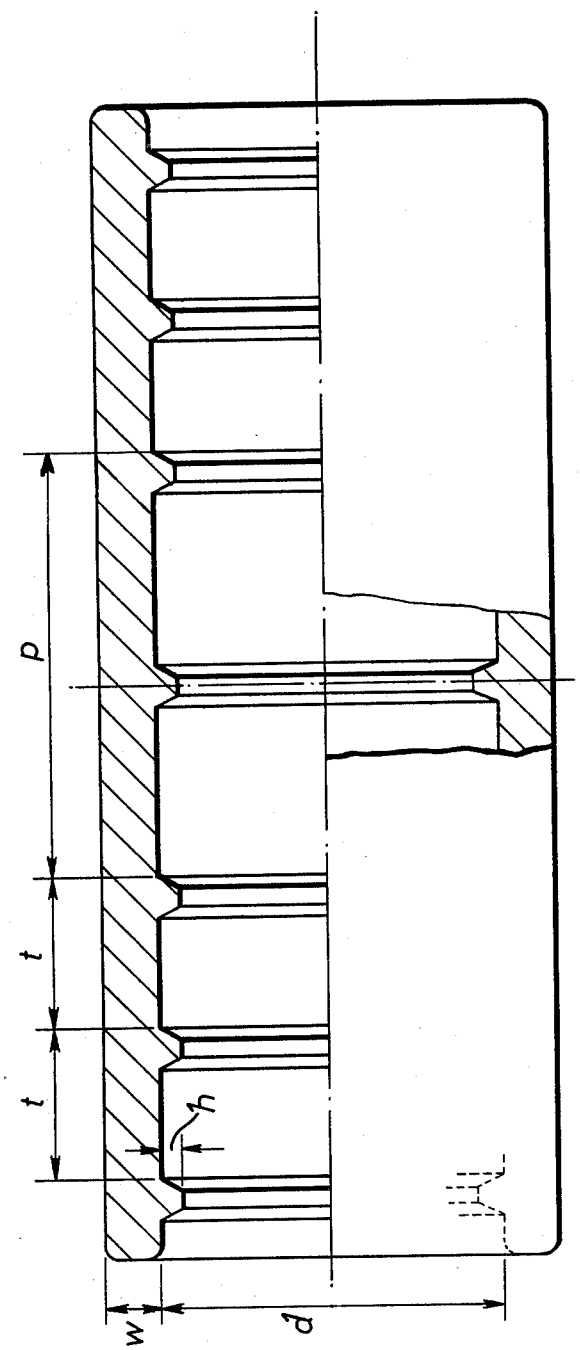

4,226,448

HEAT-RECOVERABLE METALLIC COUPLINGS

CROSS-REFERENCE TO RELATED APPLICATION

This application is a continuation-in-part of my application Ser. No. 869,720 filed Jan. 16, 1978, now abandoned.

BACKGROUND OF THE INVENTION

1. Field of the Invention

This invention relates to monolithic heat-recoverable metallic couplings.

2. Summary of the Prior Art

Heat-recoverable metallic couplings and their preparation have been described in, for example, U.S. Pat. Nos. 4,035,007 (Harrison et al) and 3,805,567 (Agius-Sinerco), the disclosures of which are hereby incorporated by reference. The couplings comprise a heat-recoverable tubular member, which may recover directly onto the pipes (or other substrates) to be coupled, as in the monolithic couplings, for example as described in the above patents, or a suitable non-heat-recoverable insert may be placed between the heat-recoverable member and the substrates, as in the composite couplings, for example described in German Offenlegungschrift No. 2,448,160 and commonly assigned U.S. applications Ser. Nos. 404,723, 404,724, 608,206 and 608,209, the disclosures of which are hereby incorporated by reference. In the monolithic couplings the heat-recoverable member is preferably provided on its inner surface with at least one, and generally at least two, teeth either side of the center of the member, the teeth being in the form of radially extending rings, the separation between the innermost teeth either side of the center of the coupling being greater than the separation between adjacent teeth on each side of the coupling. The function of these teeth is to grip and/or seal to the substrates when the member is recovered, and they cause deformation of the substrates which helps to provide these desirable results. In the known monolithic couplings the center section of the inner surface is free of teeth (and indeed has often been provided with a recess such that the ends of the tubings being coupled do not touch the coupling at any point). The conventional method of preparing such monolithic couplings is to drive a tapered mandrel through the coupling while the metal is in the martensitic state.

SUMMARY OF THE INVENTION

A disadvantage of the mandrel expansion method is that under some circumstances the mandrel can score or otherwise damage one or more of the teeth in a way which allows the installed coupling to leak. I have now discovered a novel coupling member in which teeth are so disposed on the inner surface of the member that the likelihood of damage to the teeth by the mandrel is substantially reduced. I have discovered that, contrary to the accepted teaching in the art as represented by U.S. Pat. No. 4,035,007, it is advantageous that the center section of the coupling member should be provided with a tooth, especially when the distance between the innermost gripping teeth defining the center section is relatively large.

In one embodiment, the invention provides a coupling which comprises a hollow, generally tubular metal member which is heat-shrinkable in the radial direction and is provided on its inner surface with at least three teeth in the form of radially extending rings, the distance (t) between any pair of adjacent teeth having a value which is less than 0.95 d and less than 4 w, where d is the internal diameter of the tubular member and w is the wall thickness of the tubular member, there being at least one tooth either side of the tooth nearest the center of the tubular member, and the distance from the center of the member to the tooth nearest the center of the member being from 0 to 0.3 d, and the distance (p) between the two teeth adjacent the tooth nearest the center of the member being more than the smaller of 0.4 d and 3 w.

In a second embodiment, the invention provides a hollow, generally tubular coupling member formed of a metallic material which exists in a martensitic phase at a first temperature and in an austenitic phase at a second temperature higher that the first temperature, which member, when cooled from a temperature at which it is in a first configuration with the metallic material in the austenitic phase to a temperature at which the metallic material is in the martensitic phase, can be deformed to a second configuration and will recover from said second configuration substantially towards said first configuration when reheated to a temperature at which the metallic material is in the austenitic phase, and which member is provided on its inner surface with at least three teeth in the form of radially extending rings, the distance (t) between any pair of adjacent teeth having a value which is less than 0.95 d and less than 4 w, where d is the internal diameter of the tubular member, and w is the wall thickness of the tubular member, the distance from the center of the member to the tooth nearest the center of the member being from 0 to 0.3 d, there being at least one tooth either side of the tooth nearest the center of the member, and the distance (p) between the two teeth adjacent the tooth nearest the center of the member having a value which is more than the smaller of 0.4 d and 3 w.

In a third embodiment, the invention provides a method of preparing a coupling which comprises diametrically expanding a hollow generally tubular coupling member having a first configuration and formed of a metallic material which is in a martensitic phase while the member is being expanded but which exists in an austenitic phase at a higher temperature, said diametric expansion being effected by driving a tapered mandrel through the tubular member, and said member being provided on its inner surface with at least three teeth in the form of radially extending rings, the distance (t) between any pair of adjacent teeth having a value which is less than 0.95 d and less than 4 w, where d is the internal diameter of the tubular member and w is the wall thickness of the tubular member, the distance from the center of the member to the tooth nearest the center of the member being from 0 to 0.3 d, there being at least one tooth either side of the tooth nearest the center of the member, and the distance (p) between the two teeth adjacent the tooth nearest the center of the member having a value which is more than the smaller of 0.4 d and 3 w, whereby the coupling member is deformed to a second configuration while the metallic material is in the martensitic phase, but on heating to a temperature at which the metallic material is in the austenitic phase, recovers substantially towards said first configuration.

BRIEF DESCRIPTION OF THE DRAWINGS

The invention is illustrated in the accompanying drawings in which the FIGURE is a cross-section of a coupling member according to the invention.

DETAILED DESCRIPTION OF THE INVENTION

The less the distance (t) between any pair of adjacent teeth, the less is the danger that the mandrel will damage the teeth. The distance t is generally less than 0.8 d, preferably less than 0.75 d, especially less than 0.7 d, particularly less than 0.6 d. The internal diameter of the member between the teeth is generally less than 3 inches, e.g. 1 to 2.5 inches, but can be much greater. The height of the teeth (h) is generally from 0.015 d to 0.02 d. The wall thickness (w) of the member is generally not more than 0.45 d, for example 0.1 d to 0.4 d, preferably 0.2 d to 0.35 d, e.g. 0.23 d to 0.33 d.

The distance (p) between the two teeth adjacent the tooth nearest the center of the member is usually at least 0.6 d, preferably at least 0.75 d, for example at least 0.80 d or 0.9 d. The couplings will usually comprise at least two teeth either side of the tooth nearest the center of the member, and will usually be symmetrical about the midpoint thereof.

Referring now to the drawings, it will be seen that the distances p and t are measured between corresponding points on the teeth, and that the thickness w and the internal diameter d are measured between the teeth.

I claim:

1. A coupling which comprises a hollow, generally tubular metal member which is heat-shrinkable in the radial direction and is provided on its inner surface with at least three teeth in the form of radially extending rings, the distance (t) between corresponding points on any pair of adjacent teeth having a value which is less than 0.95 d and less than 4 w, where d is the internal diameter of that portion of the tubular member between the teeth, and w is the wall thickness of that portion of the tubular member between the teeth, the distance from the center of the member to the tooth nearest the center of the member being from 0 to 0.3 d, there being at least one tooth either side of the tooth nearest the center of the member, and the distance (p) between corresponding points on the two teeth adjacent the tooth nearest the center of the member having a value which is more than the smaller of 0.4 d and 3 w.

2. A coupling according to claim 1 wherein said tubular member has a wall thickness (w) between the teeth which is from 0.1 d to 0.4 d.

3. A coupling according to claim 2 wherein w is from 0.23 d to 0.33 d.

4. A coupling according to claim 1 wherein the distance (t) between corresponding points on any pair of adjacent teeth is at most 0.75 d.

5. A coupling according to claim 4 wherein t is at most 0.6 d.

6. A coupling according to claim 1 wherein the distance (p) between corresponding points on the two teeth adjacent the tooth nearest the center of the member is at least 0.75 d.

7. A coupling according to claim 6 wherein p is at least 0.80 d.

8. A coupling according to claim 1 wherein w is from 0.1 d to 0.4 d, t is at most 0.75 d, p is at least 0.75 d and the height of the teeth h is from 0.015 d to 0.02 d.

9. A coupling according to claim 8 wherein w is from 0.2 d to 0.33 d, t is at most 0.6 d and p is at least 0.8 d.

10. A coupling according to claim 9 wherein p is at least 0.9 d.

11. A coupling according to claim 8 which comprises at least two said teeth either side of said tooth nearest the center of the member.

12. A coupling according to claim 11 which is symmetrical about the mid-point thereof.

13. A hollow, generally tubular coupling member formed of a metallic material which exists in a martensitic phase at a first temperature and in an austenitic phase at a second temperature higher than the first temperature, which member, when cooled from a temperature at which it is in a first configuration with the metallic material in the austenitic phase to a temperature at which the metallic material is in the martensitic phase, can be deformed to a second configuration and will recover from said second configuration substantially towards said first configuration when reheated to a temperature at which the metallic material is in the austenitic phase, and which member is provided on its inner surface with at least three teeth in the form of radially extending rings, the distance (t) between corresponding points on any pair of adjacent teeth having a value which is less than 0.95 d and less than 4 w, where d is the internal diameter of that portion of the tubular member between the teeth, and w is the wall thickness of that portion of the tubular member between the teeth, the distance from the center of the member to the tooth nearest the center of the member being from 0 to 0.3 d, there being at least one tooth either side of the tooth nearest the center of the member, and the distance (p) between corresponding points on the two teeth adjacent the tooth nearest the center of the member having a value which is more than the smaller of 0.4 d and 3 w.

14. A coupling member according to claim 13 wherein w is from 0.2 d to 0.4 d, t is at most 0.6 d, and p is at least 0.6 d.

15. A coupling according to claim 14 wherein the height of the teeth is from 0.015 d to 0.02 d.

16. A coupling member according to claim 16 which comprises at least two said teeth either side of said tooth nearest the center of the member.

17. A coupling member according to claim 16 which is symmetrical about the mid-point thereof.

18. A method of preparing a coupling which comprises diametrically expanding a hollow generally tubular coupling member having a first configuration and formed of a metallic material which is in a martensitic phase while the material is being expanded but which exists in an austenitic phase at a higher temperature, said diametric expansion being effected by driving a tapered mandrel through the tubular member, and said member being provided on its inner surface with at least three teeth in the form of radially extending rings, the distance (t) between corresponding points on any pair of adjacent teeth having a value which is less than 0.95 d and less than 4 w, where d is the internal diameter of that portion of the tubular member between the teeth and w is the wall thickness of that portion of the tubular member between the teeth, the distance from the center of the member to the tooth nearest the center of the member being from 0 to 0.3 d, there being at least one tooth either side of the tooth nearest the center of the member, and the distance (p) between corresponding points on the two teeth adjacent the tooth nearest the center of the member being more than the smaller of 0.4 d and 3 w, whereby the coupling member is deformed to a second configuration while the metallic material is in the martensitic phase, but on heating to a temperature at which the metallic material is in the austenitic phase, recovers substantially towards said first configuration.

19. A method according to claim 18 wherein the coupling member has a wall thickness (w) between the teeth which is from 0.2 d to 0.4 d, wherein the distance (t) between corresponding points on any pair of adjacent teeth is at most 0.6 d, and wherein the distance (p) between corresponding points on the two teeth adjacent the tooth nearest the center of the member is at least 0.80 d.

20. A method according to claim 19 wherein the height of the teeth is from 0.015 d to 0.02 d.

21. A method according to claim 19 wherein the coupling member is symmetrical about the mid-point thereof.

* * * * *